United States Patent
Strzyzewski et al.

(10) Patent No.: US 10,913,138 B2
(45) Date of Patent: Feb. 9, 2021

(54) MASKING FIXTURE

(71) Applicant: General Electric Company, Schenectady, NY (US)

(72) Inventors: Mariusz Strzyzewski, Pruszkow (PL); Michal Kowalczyk, Baranow (PL); Pawel Stanislaw Skiba, Stalowa Wola (PL); Mihaly Laszlo Bekey, Konstancin-Jeziorna (PL)

(73) Assignee: General Electric Company, Schenectady, NY (US)

( * ) Notice: Subject to any disclaimer, the term of this patent is extended or adjusted under 35 U.S.C. 154(b) by 377 days.

(21) Appl. No.: 15/982,746

(22) Filed: May 17, 2018

(65) Prior Publication Data

US 2018/0333824 A1 Nov. 22, 2018

(30) Foreign Application Priority Data

May 17, 2017 (PL) .......................................... 421619

(51) Int. Cl.
*B24C 9/00* (2006.01)
*B24C 1/04* (2006.01)
(Continued)

(52) U.S. Cl.
CPC ................ *B24C 9/00* (2013.01); *B23P 6/002* (2013.01); *B24B 31/12* (2013.01); *B24C 1/04* (2013.01); *B24C 3/065* (2013.01); *B24C 3/32* (2013.01); *B24C 9/003* (2013.01); *F01D 5/005* (2013.01); *F01D 25/002* (2013.01); *B23P 2700/06* (2013.01); *F01D 5/186* (2013.01);
(Continued)

(58) Field of Classification Search
CPC .. B24C 9/00; B24C 1/04; B24C 3/065; B24C 3/32; B24C 9/004132; F01D 5/005
USPC ........................................................... 451/29
See application file for complete search history.

(56) References Cited

U.S. PATENT DOCUMENTS 4,530,861 A * 7/1985 Sippel ...................... B05D 1/32
427/444
4,612,737 A * 9/1986 Adee .................... G10K 11/172
451/29

(Continued)

FOREIGN PATENT DOCUMENTS

| EP | 1 057 568 A2 | 12/2000 |
| EP | 2 289 666 A2 | 3/2011 |
| JP | S57-58993 A | 4/1982 |

OTHER PUBLICATIONS

Extended European Search Report and Opinion issued in connection with corresponding EP Application No. 18171489.0 dated Oct. 9, 2018.

*Primary Examiner* — George B Nguyen
(74) *Attorney, Agent, or Firm* — James Pemrick; Hoffman Warnick LLC

(57) ABSTRACT

A masking fixture includes a flexible cover and a rigid cover. The flexible cover is received within a cavity of the rigid cover. An air connector provides for a purge flow supply to be connected to the masking fixture via a port in fluid communication with an enclosure of the flexible cover. A method of treating a workpiece includes directing a pressurized fluid jet comprising an abrasive media entrained therein against an exterior surface of the workpiece and directing a purge flow through the workpiece while directing the pressurized fluid jet against the exterior surface.

16 Claims, 10 Drawing Sheets

(51) Int. Cl.
*B24C 3/06* (2006.01)
*F01D 5/00* (2006.01)
*B24C 3/32* (2006.01)
*B24B 31/12* (2006.01)
*B23P 6/00* (2006.01)
*F01D 25/00* (2006.01)
*F01D 9/06* (2006.01)
*F01D 5/18* (2006.01)
*F01D 25/28* (2006.01)

(52) U.S. Cl.
CPC ............ *F01D 9/065* (2013.01); *F01D 25/285* (2013.01); *F05D 2220/30* (2013.01); *F05D 2230/10* (2013.01); *F05D 2230/80* (2013.01); *F05D 2240/128* (2013.01); *F05D 2260/202* (2013.01); *F05D 2260/607* (2013.01)

(56) References Cited

U.S. PATENT DOCUMENTS

| | | | | |
|---|---|---|---|---|
| 5,006,207 A | * | 4/1991 | Peterman | B24O 1/04 205/120 |
| 5,063,015 A | * | 11/1991 | Lloyd | B24O 1/003 264/161 |
| 5,247,766 A | * | 9/1993 | Kildea | B24O 3/325 451/36 |
| 6,485,655 B1 | | 11/2002 | Das et al. | |
| 7,134,946 B1 | * | 11/2006 | Jackson | B24O 1/003 451/75 |
| 2010/0053853 A1 | * | 3/2010 | Allore | B29C 48/12 361/679.01 |
| 2010/0135822 A1 | * | 6/2010 | Marini | F01D 5/20 416/97 R |
| 2012/0090278 A1 | * | 4/2012 | Ortenzi | A61B 50/37 53/475 |
| 2013/0167870 A1 | | 7/2013 | Bellino et al. | |
| 2013/0174923 A1 | | 7/2013 | Bellino et al. | |
| 2014/0003951 A1 | * | 1/2014 | Soucy | F01D 5/34 416/223 A |
| 2014/0030077 A1 | * | 1/2014 | Von Arx | F01D 5/005 415/183 |
| 2017/0053679 A1 | * | 2/2017 | Albrecht | G11B 33/027 |
| 2017/0067561 A1 | * | 3/2017 | Alam | F16J 15/022 |
| 2018/0092478 A1 | * | 4/2018 | Wilson | B65D 25/205 |

* cited by examiner

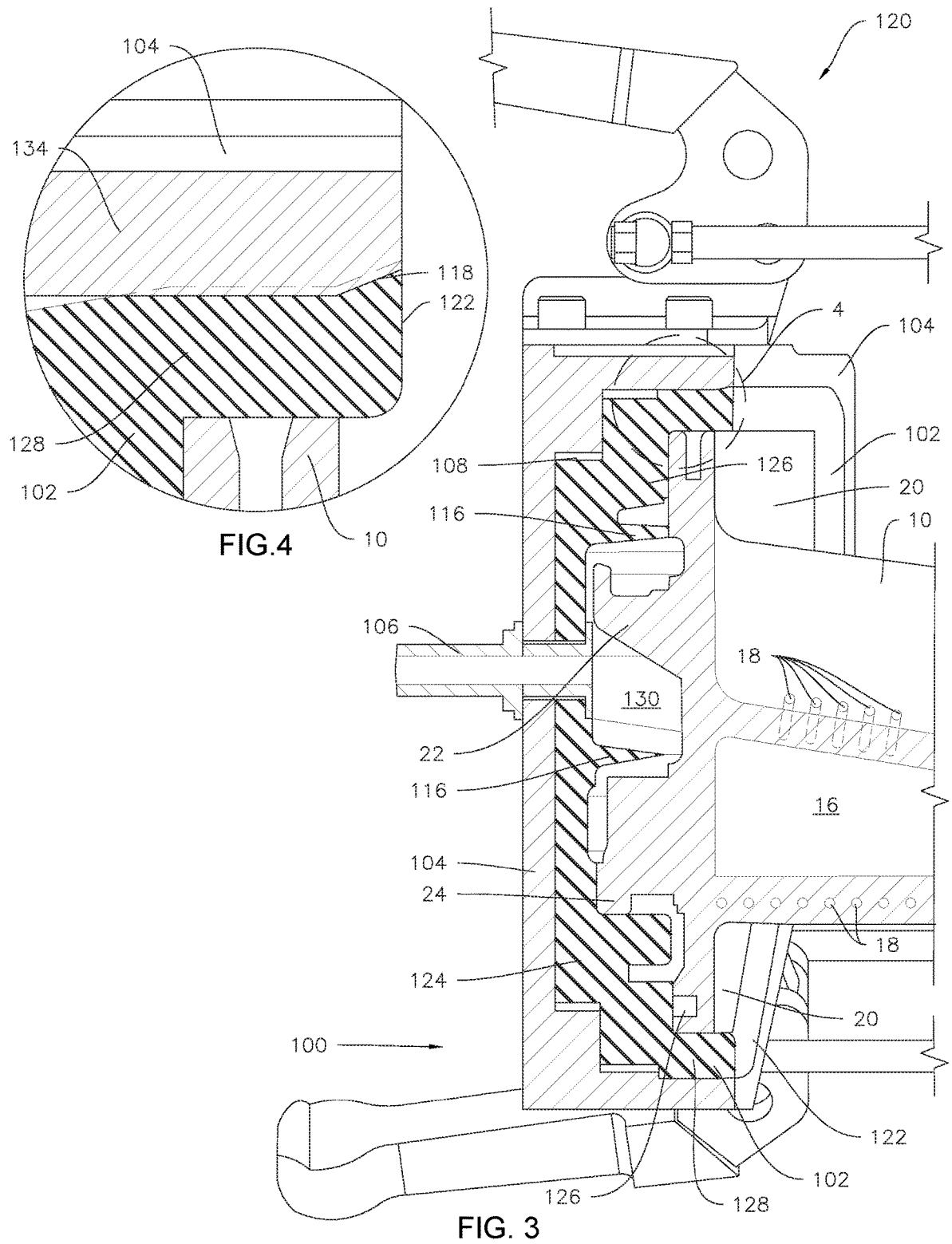

MASKING FIXTURE

FIELD

The present disclosure generally involves a masking fixture and related methods of using the masking fixture with a workpiece.

BACKGROUND

Abrasive blasting, such as sand blasting, may be used to clean or repair surfaces of various components. For example, abrasive blasting may be used to repair components of a turbomachine, such as components of a gas turbine. Abrasive blasting generally involves directing a high-pressure stream or jet of a fluid with abrasive media entrained in the fluid against a surface of the component.

However, the abrasive media may have a deleterious effect on surface features of some components. For example, components of a turbomachine which are exposed to high operating temperatures generally include cooling features such as an internal cooling cavity and cooling holes in an exterior surface which open into the cooling cavity. For such components, the abrasive media may be entrapped in the cooling cavity or cooling holes, which can impede the function of the cooling features.

BRIEF DESCRIPTION

Aspects and advantages of the invention are set forth below in the following description, or may be obvious from the description, or may be learned through practice of the invention.

According to one example embodiment, a method of treating a workpiece is provided. The method includes directing a pressurized fluid jet comprising an abrasive media entrained in the pressurized fluid jet against an exterior surface of the workpiece and directing a purge flow through the workpiece while directing the pressurized fluid jet against the exterior surface.

In accordance with another example embodiment, a masking fixture for protecting selected portions of a workpiece during treatment of the workpiece is provided. The masking fixture includes a flexible cover. The flexible cover includes a peripheral rim and a base wall parallel to and spaced from the peripheral rim. The flexible cover also includes a plurality of sidewalls extending between the peripheral rim and the base wall. The plurality of sidewalls are generally orthogonal to the peripheral rim and the base wall. The flexible cover also includes an enclosure defined by the base wall and the plurality of sidewalls. The flexible cover further includes an internal rim. The internal rim extends parallel to the peripheral rim and the base wall. The internal rim is positioned within the enclosure between the base wall and the peripheral rim. The flexible cover also includes a projection extending from the base wall towards the peripheral rim. The projection is generally orthogonal to the base wall. A port is formed in the base wall for connecting a purge air supply. The port is in fluid communication with the enclosure.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 3 is a section view of a portion of the exemplary masking fixture of FIG. 1;

FIG. 4 is an enlarged view of a portion of FIG. 3;

DETAILED DESCRIPTION

Figure 1:
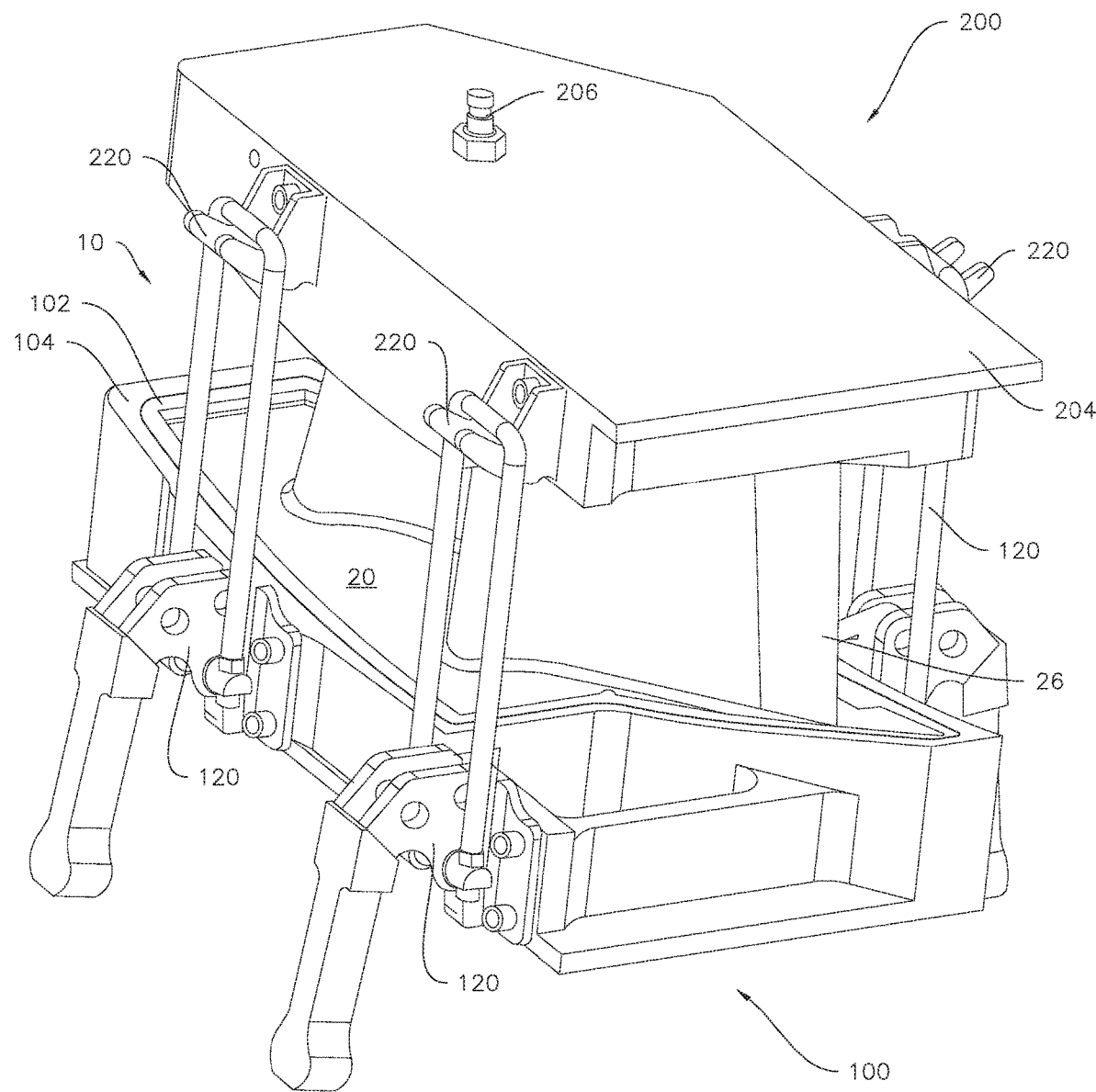
FIG. 1 is a perspective view of an exemplary masking fixture according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a masking fixture for treating components of a land based power generating gas turbine for purposes of illustration, one of ordinary skill in the art will readily appreciate that embodiments of the present invention may be applied to any type of turbomachine component or other workpiece. In addition, the component may be associated with any turbomachine type such as a steam turbine, a marine gas turbine or aircraft gas turbine and is not limited to land based power generating gas turbine components unless specifically recited in the claims.

Referring now to the drawings, wherein identical numerals indicate the same elements throughout the figures, FIG. 1 provides a perspective view of an outer masking fixture 100 and an inner masking fixture 200, where the outer masking fixture 100 and the inner masking fixture 200 are fastened together about a workpiece 10. In the particular example illustrated herein, the workpiece 10 is a nozzle segment, such as a nozzle segment of a gas turbine.

Figure 2:
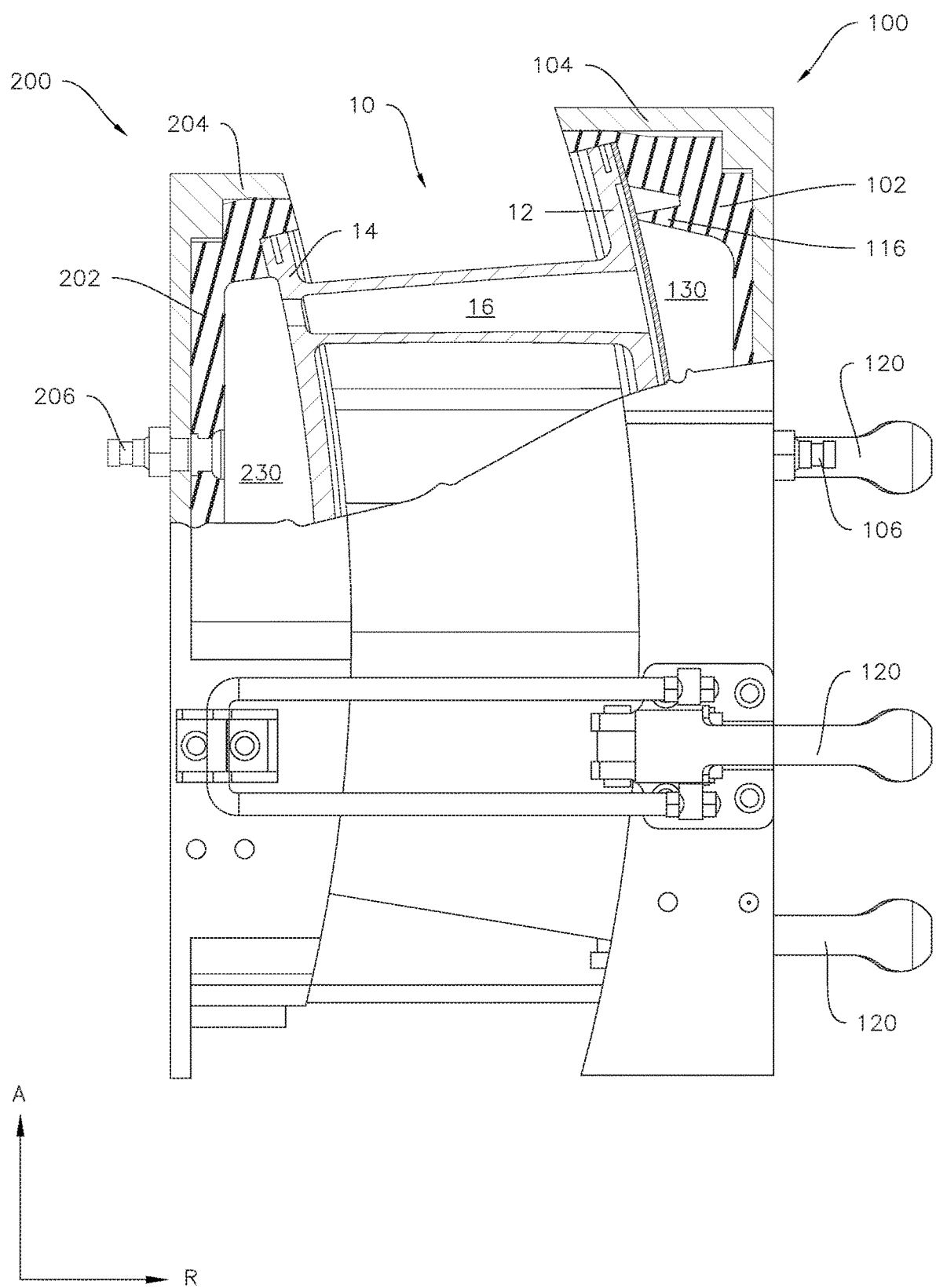
FIG. 2 is a partial section view of the exemplary masking fixture of FIG. 1.

As may be seen in FIG. 2, the outer masking fixture 100 and the inner masking fixture 200 may be spaced apart along a radial direction R. The radial direction R extends perpendicular to an axial direction A. The outer masking fixture 100 is configured to be positioned on a radially outer end 12 of the nozzle segment 10 and the inner masking fixture 200 is configured to be positioned on a radially inner end 14 of the nozzle segment 10. As used herein, the radially inner end 14 of the nozzle segment 10 refers to the end of the nozzle segment 10 which, when installed in a turbomachine, is closer to the axial centerline of the turbomachine and the radially outer end 12 of the nozzle segment 10 refers to the end of the nozzle segment 10 which, when installed in the turbomachine, is farther from the axial centerline of the turbomachine.

Also shown in the illustrated example embodiment of FIG. 2, each masking fixture 100, 200 may also include a plurality of fasteners 120, 220. For example, the outer masking fixture 100 may include a plurality of fasteners 120 extending from the rigid cover 104 for securing the outer masking fixture 100 to a complementary masking fixture, e.g., inner masking fixture 200, about the workpiece 10. Similarly, the inner masking fixture 200 may include a plurality of mating fasteners 220 such that outer masking fixture 100 and inner masking fixture 200 may be fastened together about workpiece 10. In the illustrated embodiment, the fasteners 120 of the outer masking fixture 100 may comprise a plurality of clamps, and the fasteners 220 of the inner masking fixture 200 may include a plurality of hooks which are configured to engage the clamps of the outer masking fixture 100. In other embodiments, any suitable fasteners, e.g., threaded fasteners, latches, and/or flexible straps such as woven straps or elastomeric straps, may be provided.

Referring now to FIGS. 1-4, each masking fixture 100, 200 includes a flexible cover 102, 202 and a rigid cover 104, 204. FIG. 3 illustrates an example embodiment of outer masking fixture 100 as installed on the outer end 12 of a nozzle segment 10. It is to be understood that embodiments of the present disclosure include two complementary masking fixtures, e.g., outer masking fixture 100 and inner masking fixture 200. Each masking fixture 100, 200 includes similar features as the other masking fixture 100, 200. Accordingly, for the sake of clarity, the following description will refer primarily to the outer masking fixture 100 by way of example, it being understood that the inner masking fixture 200 may include any or all of the same features or similar features. As illustrated in FIG. 3, the flexible cover 102 of outer masking fixture 100 may be received within a corresponding cavity 136 of the rigid cover 104. As will be described in more detail below, the flexible cover 102 is configured to form two seals, e.g., the flexible cover 102 is configured to sealingly engage the outer end 12 of the workpiece 10 and to sealingly engage the rigid cover 104.

The flexible cover 102 of outer masking fixture 100 includes a peripheral rim 122 and a base wall 124. The base wall is parallel to and spaced from the peripheral rim 122, such that a depth of the flexible cover is defined between the peripheral rim 122 and the base wall 124. In this description, for purposes of illustration only, the base wall 124 may be referred to as defining a bottom portion of the flexible cover 102 and the peripheral rim 122 may be referred to as defining a top portion of the flexible cover 102. The flexible cover 102 also includes a plurality of sidewalls 128 extending between the peripheral rim 122 and the base wall 124. The plurality of sidewalls 128 are generally orthogonal to the peripheral rim 122 and the base wall 124. As used herein, terms of approximation, such as "about," "generally," or "approximately," refer to being within ten percent above or below a stated value. Further, as used herein, such terms in the context of an angle or direction include within ten degrees. For example, the plurality of sidewalls 128 which are generally orthogonal to the peripheral rim 122 may form any angle within ten degrees of orthogonal, e.g., from eighty degrees to one hundred degrees, with the peripheral rim 122.

The flexible cover 102 may also include an enclosure 114 defined by the base wall 124 and the plurality of sidewalls 128. For purposes of illustration, the surfaces of the sidewalls 128 which face the enclosure 114 may be referred to herein as inner surfaces of the sidewalls 128, and opposing surfaces of the sidewalls 128 which face away from the enclosure 114 may be referred to as outer surfaces of the sidewalls 128.

Figure 10:
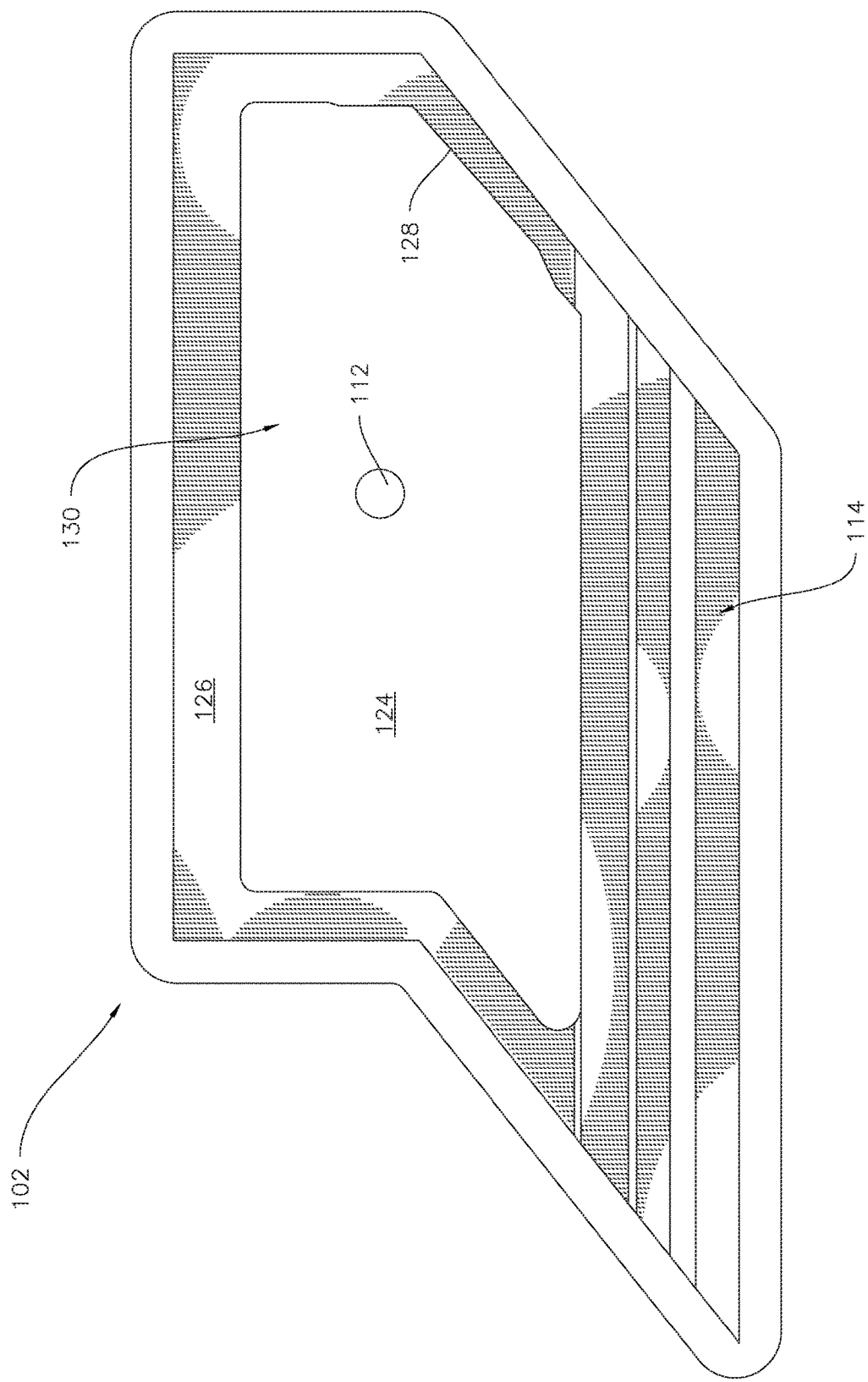
FIG. 10 is a perspective view of an exemplary outer flexible cover according to various embodiments of the present disclosure.
Figure 11:
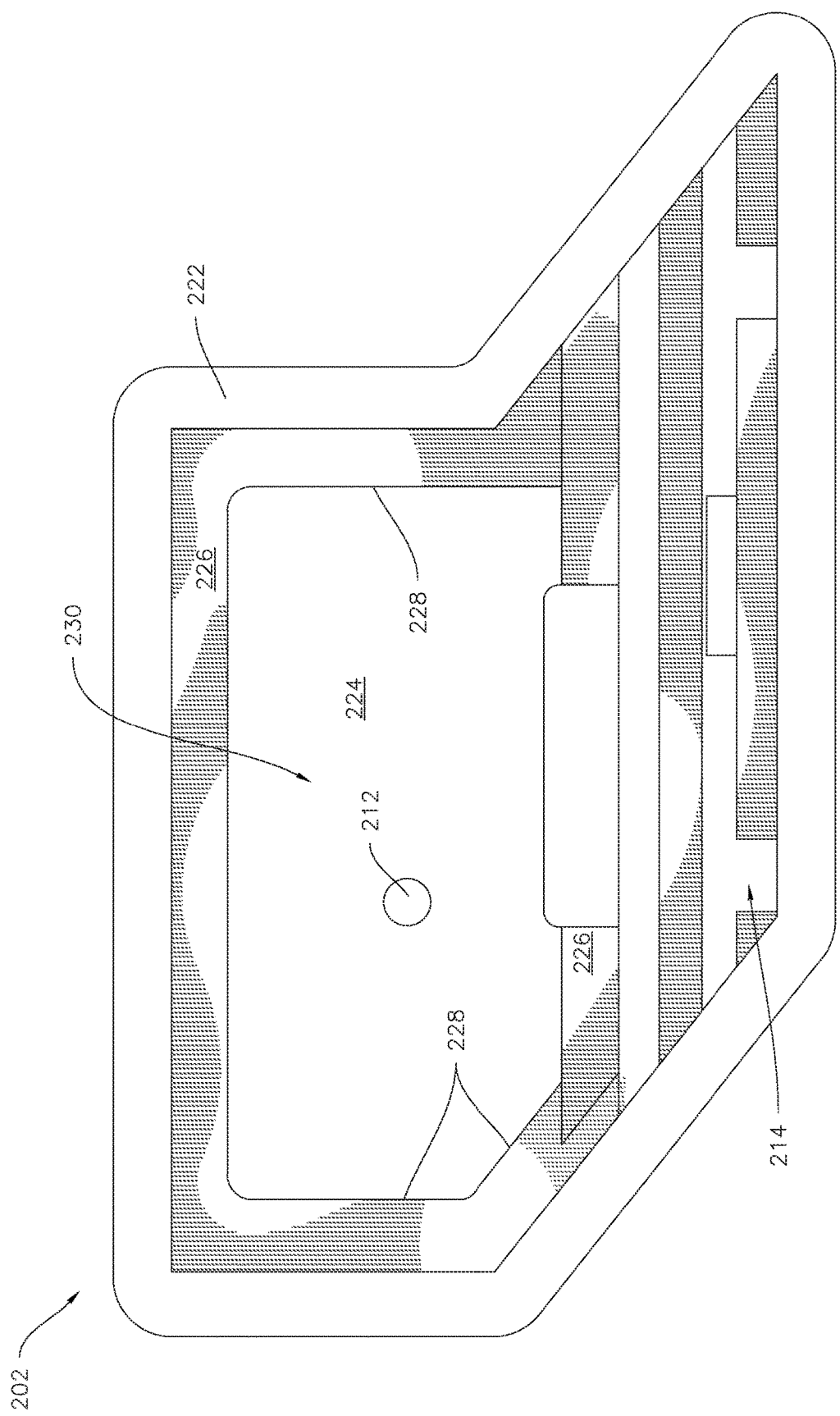
FIG. 11 is a plan view of an exemplary inner flexible cover according to various embodiments of the present disclosure.

The enclosure 114 of the flexible cover 102 may receive a portion of the workpiece 10. For example, as in the illustrated embodiment, the workpiece 10 may be a nozzle segment 10, and the nozzle segment 10 may include an outer band 20, a first hook 22, and a second hook 24. The first hook 22 and the second hook 24 may be configured for joining the nozzle segment 10 to a casing and/or a retaining ring of a turbomachine, as is generally understood in the art. As may be seen in FIG. 3, the base wall 124 of the flexible cover 102 and portions of the sidewalls 128 of the flexible cover may be configured to engage the first hook 22 and/or second hook 24. In some embodiments, the base wall 124 of the flexible cover 102 and portions of the sidewalls 128 of the flexible cover may be configured to sealingly engage the first hook 22 and/or second hook 24 (FIG. 3). The flexible cover 102 may also include an internal rim 126 extending parallel to the peripheral rim 122 and the base wall 124. In the illustrated exemplary embodiment, the internal rim 126 may be configured to engage the workpiece, such as outer band 20 of the example nozzle segment 10, as shown in FIG. 3. In some embodiments, the internal rim 126 may be configured to support and stabilize the workpiece 10, and in particular, the outer band 20 of the workpiece 10, during abrasive blasting. As may be seen in FIG. 10, the internal rim 126 may define a surface which extends around the flexible cover 102. The surface defined by internal rim 126 may be a sealing surface, for example, when the flexible cover is positioned on nozzle segment 10, the surface of the internal rim 126 may be directly adjacent to the nozzle segment and may further be configured to sealingly engage the nozzle segment 10. As illustrated for example in FIG. 3, the internal rim 126 may be positioned within the enclosure 114 between the base wall 124 and the peripheral rim 122.

Figure 5:
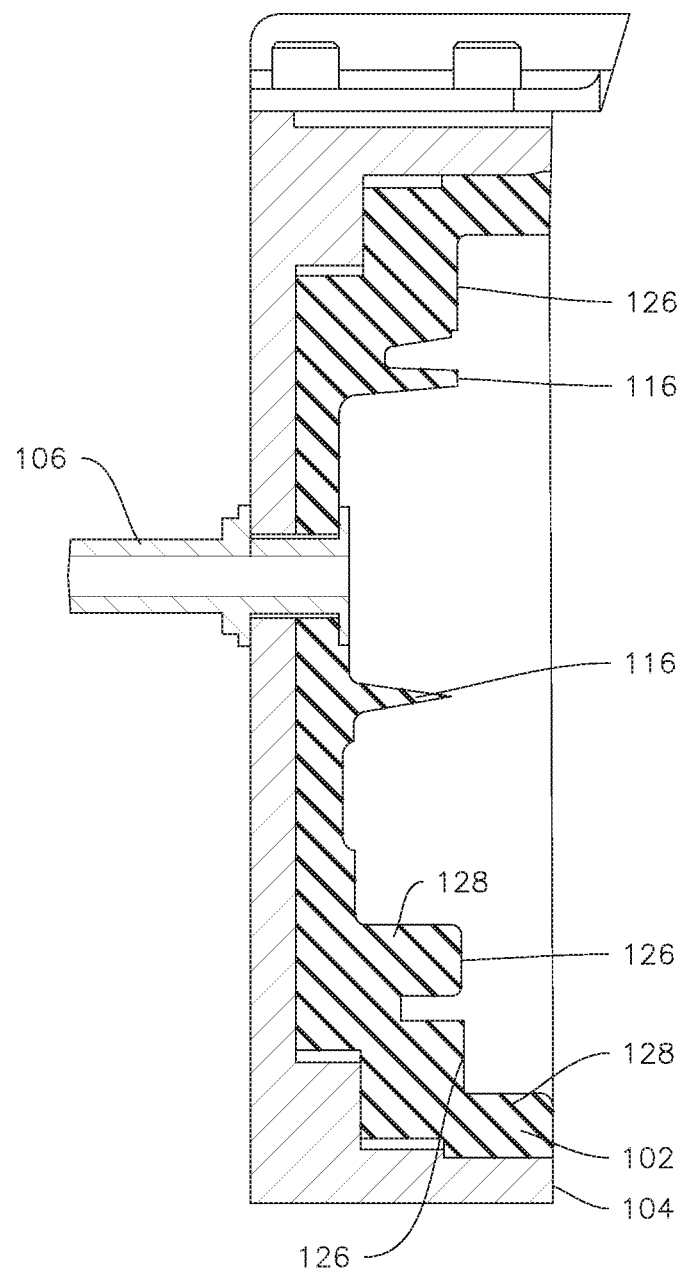
FIG. 5 is a section view of an exemplary masking fixture.

As best seen in FIG. 5, the flexible cover 102 may further include a projection 116 extending from the base wall 124 towards the peripheral rim 122. As illustrated, the projection 116 may extend generally orthogonally to the base wall 124, e.g., along the radial direction R. Thus, in this example, the flexible cover 102 of the outer masking fixture 100 may include a projection 116 which extends inward, e.g., towards the workpiece 10, along the radial direction R from the base wall 124, and a flexible cover 202 of a corresponding inner masking fixture 200 may include a projection 216 which extends outward, e.g., towards the workpiece 10, along the radial direction R from a base wall 224 of the inner masking fixture 200.

The flexible cover 102 may also include a port 112 formed in the base wall 124 for connecting a purge air supply. As illustrated, the port 112 may extend through the base wall 124 to provide fluid communication with the enclosure 114, e.g., for a purge air supply. In some embodiments, a portion of the enclosure 114 may define a purge flow cavity 130. The purge flow cavity 130, when provided, may be a pressurizable cavity defined by the base wall 124 and selected sidewalls 128 of the plurality of sidewalls 128. In some embodiments, the projection 116 may partially define the purge flow cavity 130. The purge flow cavity 130 may be further defined by the workpiece 10, e.g., as shown in the illustrated embodiments, at least one side of the purge flow cavity 130 is formed by the workpiece 10, such as by the outer band 20 of the illustrated example nozzle segment 10. As best seen in FIG. 2, in embodiments where the workpiece 10 is a hollow workpiece including an internal cavity 16, the purge flow cavity 130 may be in fluid communication with the internal cavity 16 of the workpiece 10.

Figure 6:
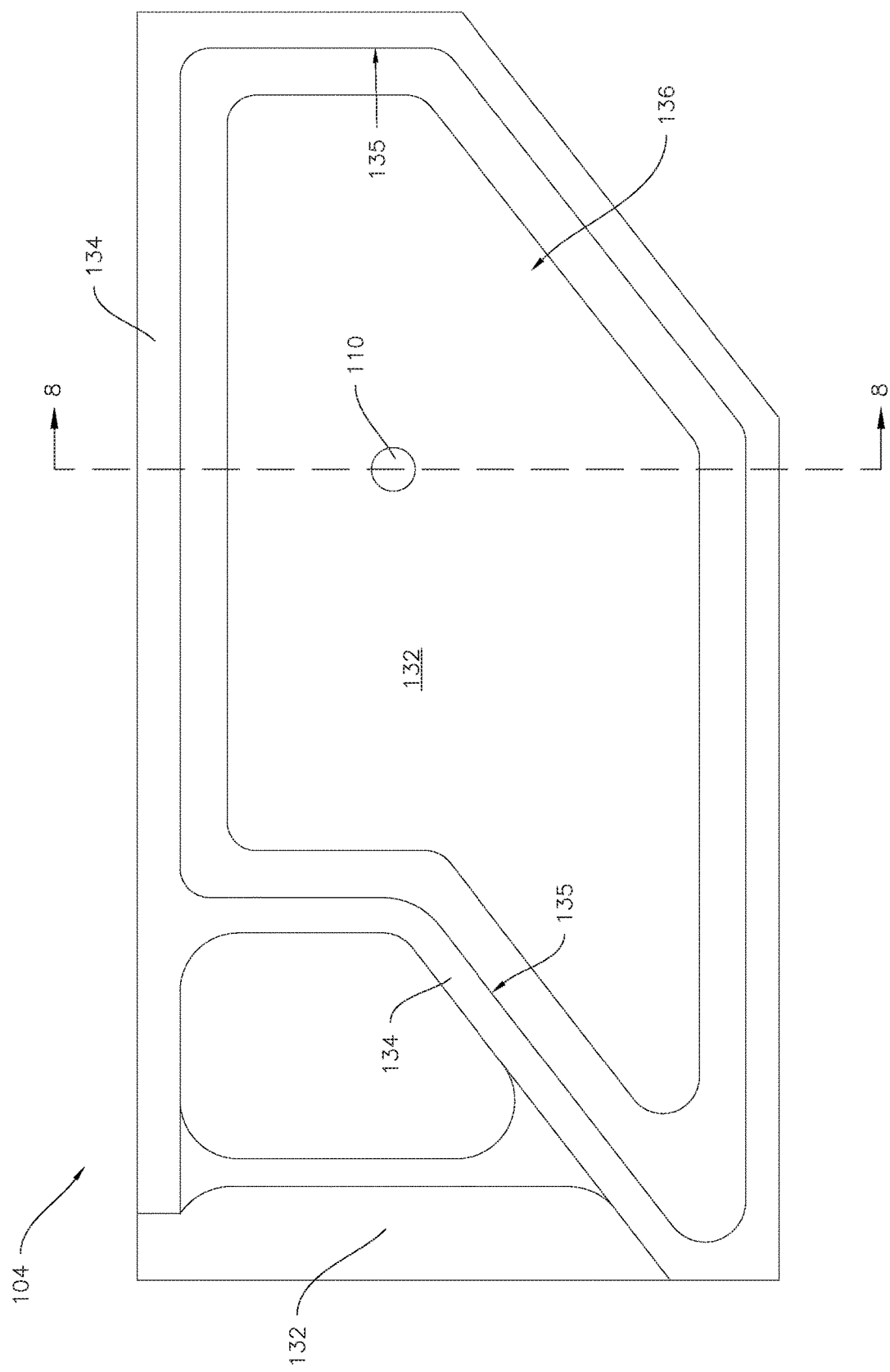
FIG. 6 is a plan view of an exemplary outer rigid cover according to various embodiments of the present disclosure.
Figure 7:
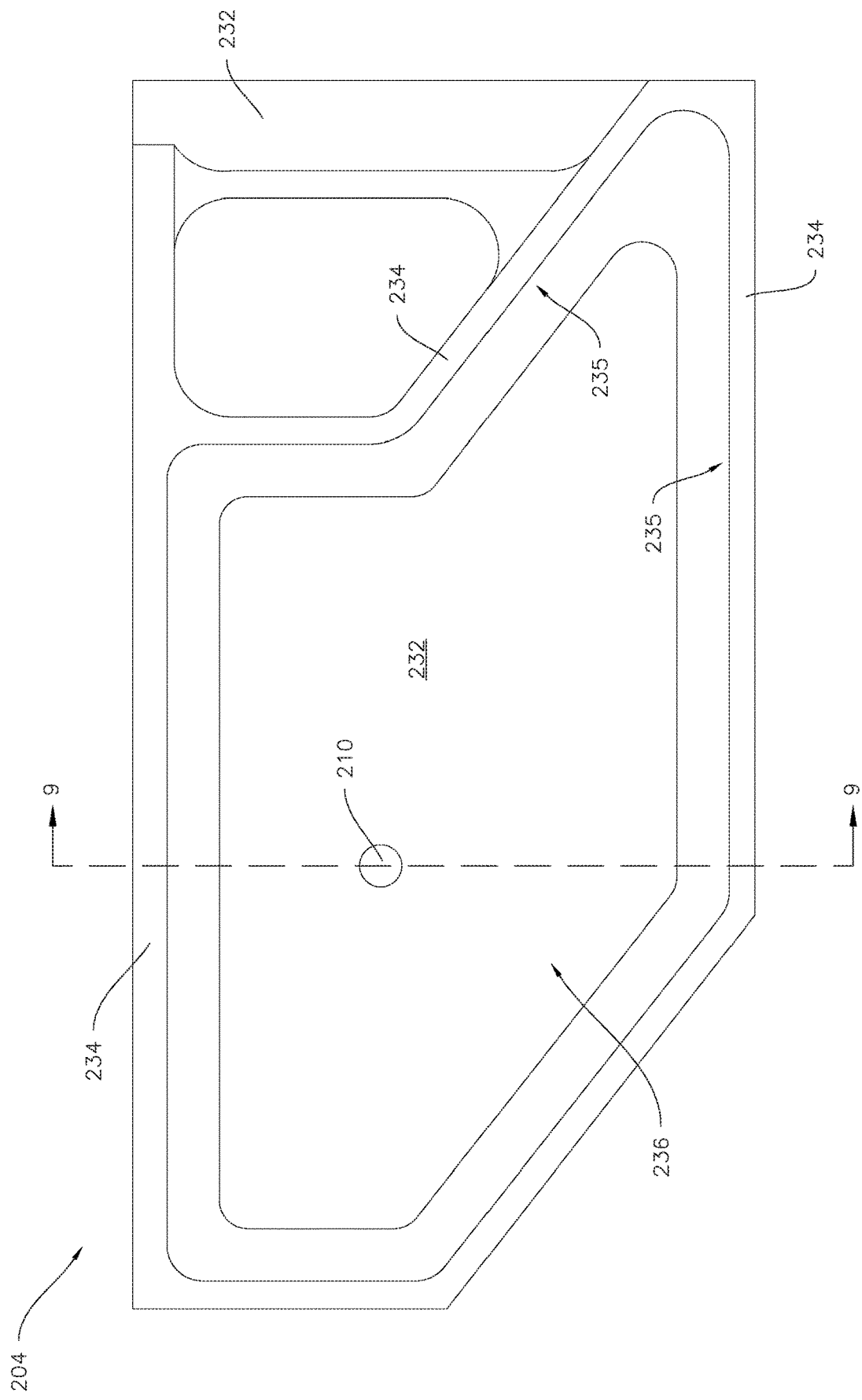
FIG. 7 is a plan view of an exemplary inner rigid cover according to various embodiments of the present disclosure.
Figure 9:
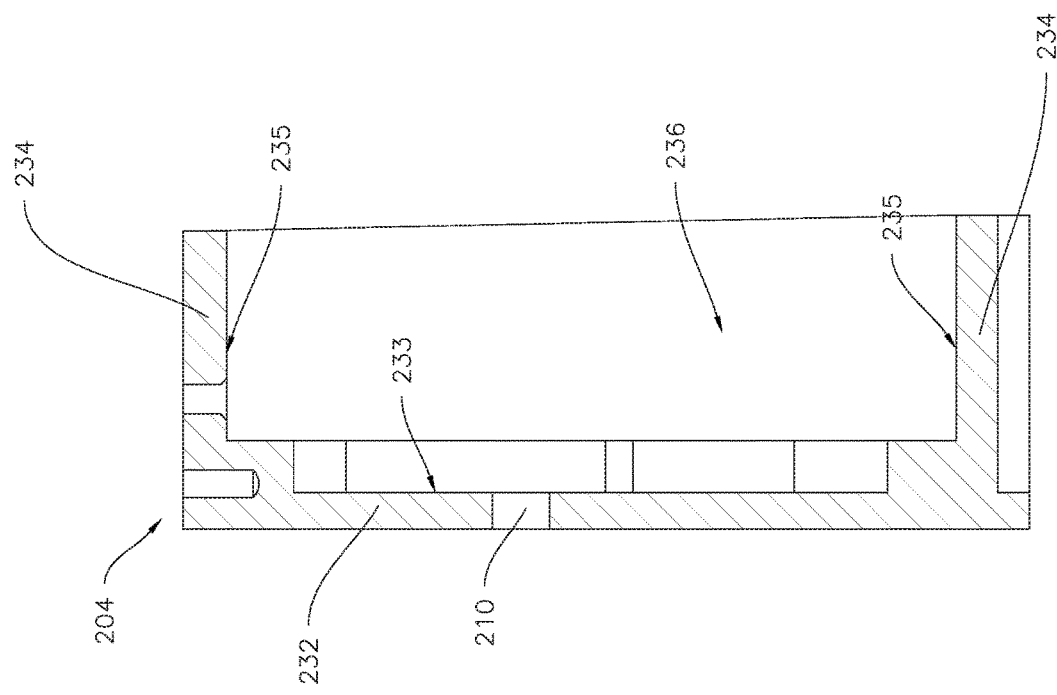
FIG. 9 is a section view taken along line 9-9 in FIG. 7.
Figure 8:
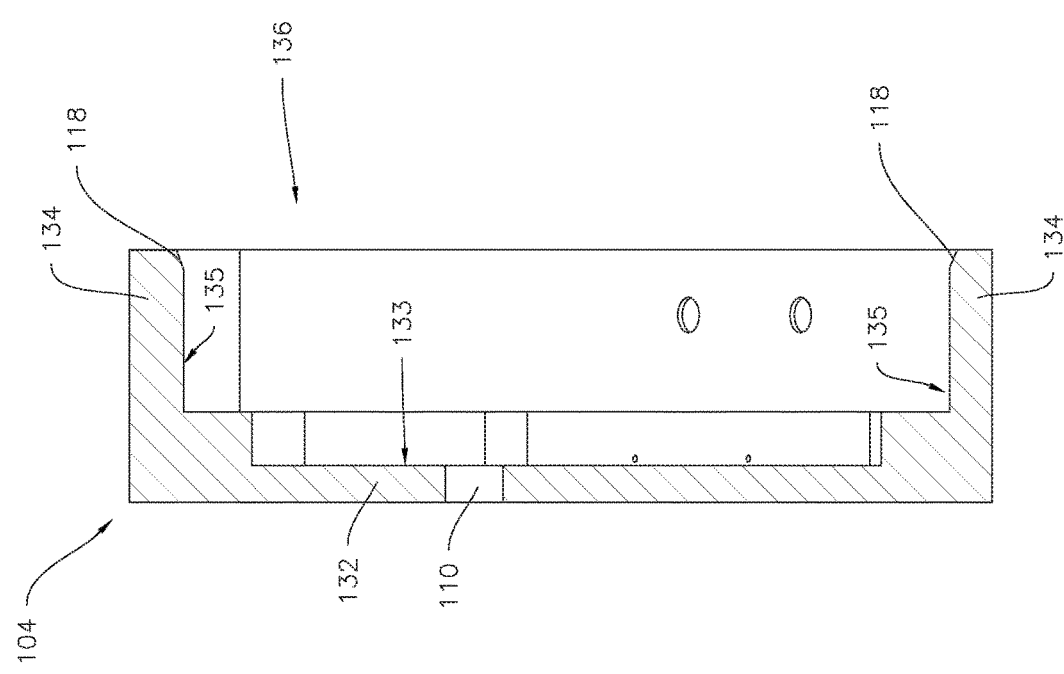
FIG. 8 is a section view taken along line 8-8 in FIG. 6.

As may be seen in FIGS. 6 and 8, the rigid cover 104 of the outer masking fixture 100 may include a base wall 132 and a plurality of side walls 134 extending generally orthogonal to the base wall 132 of the rigid cover 104. Similarly as noted above with respect to the flexible cover 102, for purposes of illustration only, the base wall 132 may be referred to as defining a bottom portion of the rigid cover 104 and the sidewalls 134 may be referred to as extending upward away from the base wall 132. An inner surface 133 of the base wall 132 of the rigid cover 104 and inner surfaces 135 of the plurality of sidewalls 134 of the rigid cover 104 define a cavity 136 of the rigid cover 104. As illustrated in FIGS. 2 through 5, the flexible cover 102 may be received within the cavity 136 of the rigid cover 104. Similarly, as seen in FIGS. 7 and 9, the rigid cover 204 of the inner masking fixture 200 may also include a base wall 232 and a plurality of side walls 234 and a cavity 236 defined by surfaces 233 and 235, respectively.

In some embodiments, as best seen in FIG. 4, the rigid cover 104 of the outer masking fixture 104 may advantageously include a chamfer 118 defined in a corner of each sidewall 134 of the rigid cover 104. For example, chamfer 118 may be defined at each top corner of the sidewalls 134, e.g., the corner of each sidewall 134 distal from the base wall 132 and on the inner surface 135 of the sidewall, e.g., the side of the sidewall 134 which abuts the outer surface of the flexible cover 102 when the flexible cover 102 is received within the cavity 136 of the rigid cover 104. Such chamfers 118 may advantageously facilitate installation of the flexible cover 102 within the cavity 136 of the rigid cover 104.

Additionally, some embodiments of the flexible cover 102 may include an outer surface configured to form an interference fit with a corresponding portion of the inner surfaces 135 of the plurality of sidewalls 134 of the rigid cover 104. As best seen in FIG. 4, the flexible cover 102 may be compressed from its original shape (the original shape shown in dashed lines in FIG. 4) due to the interference fit with the rigid cover 104. Such compression of the flexible cover 102 may advantageously promote continuous and complete sealing around the workpiece 10. In particular embodiments where the workpiece 10 includes irregular shapes and/or concave shapes, such compression of the flexible cover 102 may help to ensure the flexible cover 102 conforms to the shape of the workpiece 10 to sealingly engage the workpiece 10. For example, in embodiments where the workpiece 10 is a nozzle segment 10 including a platform 20 and hooks 22 and 24, compression of the flexible cover 102 due to the interference fit with the rigid cover 104 may promote sealing engagement of the flexible cover 102, e.g., fully around the perimeter of the platform 20. In some embodiments, the portion of the inner surfaces 135 of the plurality of sidewalls 134 of the rigid cover 104 with which the outer surface of the flexible cover 102 is configured to form an interference fit may include the chamfer 118. Additionally, in some embodiments the outer surface of the flexible cover 102 may include a first portion configured to form an interference fit with a first corresponding portion of the inner surfaces 135 of the plurality of sidewalls 134 of the rigid cover 104 and a second portion of the outer surface of the flexible cover 102 configured to form a clearance fit with a second corresponding portion of the inner surfaces 135 of the plurality of sidewalls 134 of the rigid cover 104, e.g., as illustrated in FIG. 3, a clearance 108 may be defined between the flexible cover 102 and the rigid cover 104.

In various embodiments, the outer masking fixture 100 may be paired with a second complementary masking fixture, such as the inner masking fixture 200. It is to be understood that the complementary masking fixture, e.g., inner masking fixture 200, may have corresponding features to those of the outer masking fixture 100. In some embodiments, for example, the inner masking fixture 200 may be a mirror image of the first masking fixture 100.

In some embodiments, the inner masking fixture 200 may include a flexible cover 202 and a rigid cover 204. The flexible cover 202 may include a peripheral rim 222, a base wall 224, and a plurality of sidewalls 228, similar to the peripheral rim 122, base wall 124, and plurality of sidewalls 128 of the flexible cover 102 of the outer masking fixture 100. The flexible cover 202 of the inner masking fixture 200 may further include an enclosure 214 defined by the base wall 224 and the plurality of sidewalls 228, similar to the enclosure 114 of flexible cover 102. As described above with reference to the inner rim 126, the flexible cover 202 of the inner masking fixture 200 may include an inner 226, and the inner rim 226 may be configured to support and stabilize the inner end 14 of the workpiece 10, e.g., as shown in FIG. 2.

A connector 106 may be provided, e.g., in or through the base walls 124 and 132 of each cover 102 and 104. The connector 106 permits a fluid flow supply, e.g., a purge flow supply, to be connected to the outer masking fixture 100 and in fluid communication with the enclosure 114 of the flexible cover 102, and in particular with the purge flow cavity 130 therein. The connector 106 may be connected to or may pass through a port 110 in the rigid cover 104 and a port 112 in the flexible cover 102 to permit fluid flow, e.g., purge air flow, into and through the masking fixture 100. A similar connector 206 may be provided in the inner masking fixture 200, along with ports 212 and 210 in the flexible cover 202 and rigid cover 204, respectively. The connector 206 may permit purge air flow into a pressurizable purge flow cavity 230 in the inner masking fixture 200.

Figure 12:
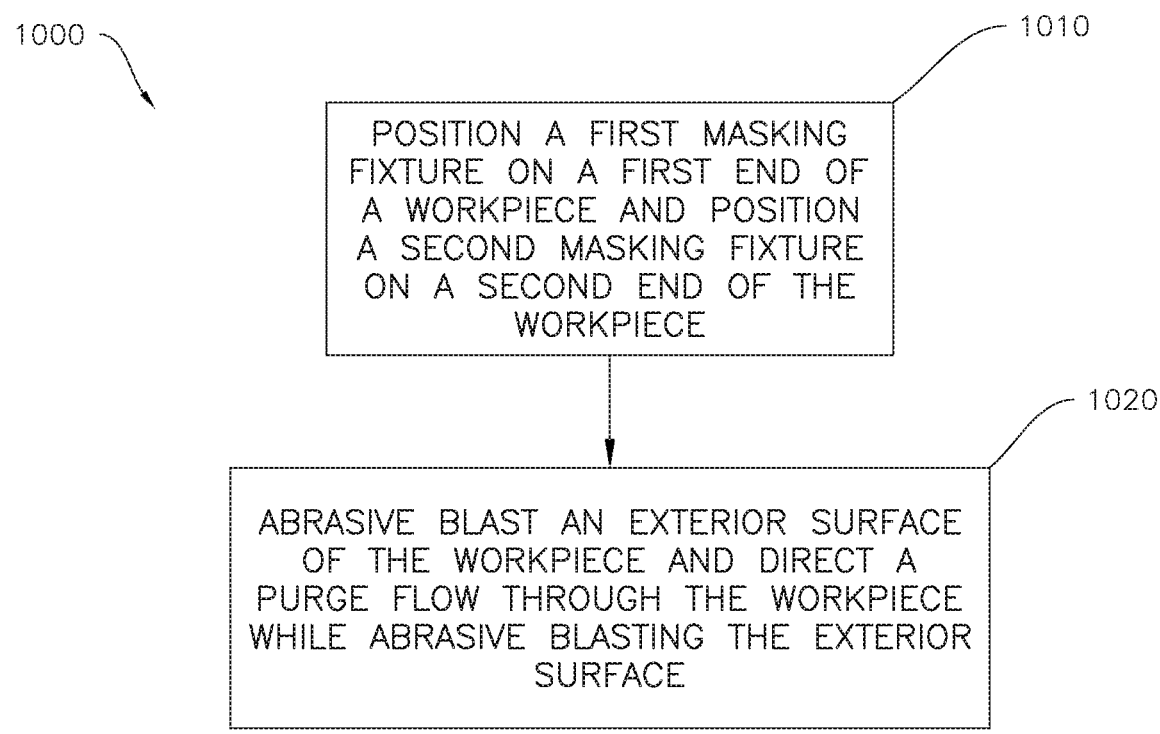
FIG. 12 provides a flowchart of a method of treating a workpiece according to an exemplary embodiment of the present subject matter.

As illustrated in FIG. 12, embodiments of the present disclosure include a method 1000 of treating a workpiece 10. The exemplary method 1000 may include an initial step 1010 of positioning a first masking fixture 100 on a first end 12 of the workpiece 10 and positioning a second masking fixture 200 on a second end 14 of the workpiece 10. In some embodiments, positioning the first masking fixture 100 may include forming a purge flow cavity 130 between a flexible sealing cover 102 of the first masking fixture 100 and the first end 12 of the workpiece 10. Further, in some embodiments positioning the second masking fixture 200 may include forming a second purge flow cavity 230 between a sealing cover 202 of the second masking fixture 200 and the second end 14 of the workpiece 10.

The example method 100 may include abrasive blasting, e.g., directing a pressurized fluid jet comprising an abrasive media, e.g., sand, entrained in the pressurized fluid jet against an exterior surface of the workpiece 10 at step 1020. The exemplary method 1000 may also include directing a purge flow through the workpiece 10 while directing the pressurized fluid jet against the exterior surface, e.g., also at step 1020. As shown in the illustrated embodiment, e.g., in FIG. 2, the method may include directing the purge flow through an interior cavity 16 of the workpiece 10. The exemplary method may further include directing the purge flow from the interior cavity 16 of the workpiece 10 to an ambient environment around the workpiece 10 through a plurality of holes 18 (FIG. 3) in the exterior surface of the workpiece 10. For example, embodiments of the holes 18 may include cooling holes or holes providing other primary functions such as ventilation, lubrication, etc., or the holes may serve as hydraulic ducts. It should be understood that the holes 18 are not limited to any particular primary function. Rather, the primary function of the holes 18 may be cooling, lubrication, or any other suitable function which may be impeded or impaired by abrasive media trapped within the holes 18 such that it is desired to prevent or remove entrapped abrasive media in the holes 18. Directing the purge flow through the interior cavity 16 and holes 18 during the abrasive blasting may be effective to prevent abrasive media, e.g., sand, from entering the holes 18 and/or cavity 16.

In some embodiments, the method of treating the workpiece 10 may include positioning the workpiece 10 in a vertical position. For example, in embodiments where the workpiece 10 is a nozzle segment, the nozzle segment 10 may include a narrower trailing edge 26 (FIG. 1). In such embodiments, positioning the nozzle segment 10 in a vertical position may include positioning the trailing edge 26 downward. Positioning the workpiece 10 in a vertical position may advantageously promote gravitational flow of the abrasive media away from the workpiece 10 after impingement of the abrasive media on the exterior surface of the workpiece 10 to reduce or avoid entrapped abrasive media, e.g., in holes 18 and/or cavity 16.

In some embodiments, the method of treating the workpiece 10 may include over pressurizing the workpiece 10, in particular the interior cavity 16 thereof. For example, the pressure of the purge flow may be greater than the pressure of the pressurized jet. In some embodiments, the pressure of the purge flow may be at least 3 bar greater than the pressure of the pressurized jet. Such pressure differences may advantageously prevent the abrasive media from entering the holes 18 and/or cavity 16 of the workpiece 10.

In various embodiments, one or both of the masking fixtures 100 and 200 may include a connector 106 and/or 206 for directing the purge flow therethrough. Thus, in some embodiments, directing the purge flow through the workpiece 10 at step 1020 may include directing the purge flow through the first masking fixture 100 (e.g., via connector 106 and ports 110, 112) into the interior cavity 16 of the workpiece 10. Some embodiments of directing the purge flow through the workpiece 10 at step 1020 may also or instead include directing the purge flow through the second masking fixture 200 (e.g., via connector 206 and ports 210, 212) into the interior cavity 16 of the workpiece 16.

In some embodiments, positioning the first masking fixture 100 on the first end 12 may include sealingly engaging the flexible sealing cover 102 of the first masking fixture 100 with the first end 12 of the workpiece 10. In some embodiments, positioning the second masking fixture 200 may include sealingly engaging the flexible sealing cover 202 of the second masking fixture 200 with the second end 14 of the workpiece 10. In such embodiments, the flexible covers 102, 202 may first be installed on the ends 12 and 14 of the workpiece 10. Further in such embodiments, the rigid covers 104, 204 may subsequently be installed over the flexible covers 102, 202.

In some embodiments, positioning the first masking fixture 100 on the first end 12 may include sealingly engaging the flexible sealing cover 102 of the first masking fixture 100 with a rigid cover 104 of the first masking fixture 100. In some embodiments, positioning the second masking fixture 200 on the second end 14 may include sealingly engaging the flexible sealing cover 202 of the second masking fixture 200 with a rigid cover 204 of the second masking fixture 200.

Some exemplary methods according to the present disclosure may include fastening together the first masking fixture 100 and the second masking fixture 200 about the workpiece 10. For example, fastening may be performed after positioning the flexible covers 102, 202 and the rigid covers 104, 204, and prior to directing the pressurized fluid jet against the exterior surface of the workpiece 10. For example, in some embodiments, the masking fixtures 100, 200 may include fasteners 120, 220, such as on outer portions of the rigid covers 104, 204. In such embodiments, closing or tightening the fasteners 120, 220 may promote sealing engagement of the flexible covers 102, 202 with the ends 12, 14 of the workpiece 10 and with the rigid covers 104, 204 of the masking fixtures 100, 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of treating a workpiece, the method comprising:
  directing a pressurized fluid jet comprising an abrasive media entrained in the pressurized fluid jet against an exterior surface of the workpiece;
  directing a purge flow through the workpiece while directing the pressurized fluid jet against the exterior surface; and
  positioning a first masking fixture on a first end of the workpiece and positioning a second masking fixture on a second end of the workpiece prior to directing the pressurized fluid jet, wherein directing the purge flow comprises directing the purge flow through a first port extending through a first base wall of the first masking fixture into an interior cavity of the workpiece and through a second port extending through a second base wall of the second masking fixture into the interior cavity of the workpiece.

2. The method of claim 1, wherein directing the purge flow comprises directing the purge flow through an interior cavity of the workpiece.

3. The method of claim 2, wherein directing the purge flow further comprises directing the purge flow from the interior cavity of the workpiece to an ambient environment around the workpiece through a plurality of holes in the exterior surface of the workpiece.

4. The method of claim 1, wherein positioning the first masking fixture comprises forming a purge flow cavity between a flexible sealing cover of the first masking fixture and the first end of the workpiece and positioning the second masking fixture comprises forming a second purge flow cavity between a sealing cover of the second masking fixture and the second end of the workpiece.

5. The method of claim 1, wherein positioning the first masking fixture further comprises sealingly engaging a first flexible sealing cover of the first masking fixture with a first end of the workpiece and wherein positioning the second masking fixture further comprises sealingly engaging a second flexible sealing cover of the second masking fixture with a second end of the workpiece.

6. The method of claim 5, wherein positioning the first masking fixture further comprises sealingly engaging the flexible sealing cover of the first masking fixture with a rigid cover of the first masking fixture and wherein positioning the second masking fixture further comprises sealingly engaging the flexible sealing cover of the second masking fixture with a rigid cover of the second masking fixture.

7. The method of claim 1, wherein directing the purge flow further comprises directing the purge flow from the interior cavity of the workpiece to an ambient environment around the workpiece through a plurality of holes in the exterior surface of the workpiece.

8. The method of claim 1, further comprising fastening together the first masking fixture and the second masking fixture about the workpiece prior to directing the pressurized fluid jet.

9. The method of claim 1, wherein a pressure of the purge flow is greater than a pressure of the pressurized jet.

10. The method of claim 9, wherein the pressure of the purge flow is at least 3 bar greater than the pressure of the pressurized jet.

11. A masking fixture for protecting a workpiece during treatment of the workpiece, the masking fixture comprising:
a flexible cover, the flexible cover comprising:
a peripheral rim;
a base wall parallel to and spaced from the peripheral rim;
a plurality of sidewalls extending between the peripheral rim and the base wall, the plurality of sidewalls generally orthogonal to the peripheral rim and the base wall;
an enclosure defined by the base wall and the plurality of sidewalls;
an internal rim extending parallel to the peripheral rim and the base wall, the internal rim positioned within the enclosure between the base wall and the peripheral rim;
a projection extending from the base wall towards the peripheral rim, the projection generally orthogonal to the base wall;
a port formed extending through the base wall for connecting a purge air supply, the port in fluid communication with the enclosure; and
a pressurized purge flow cavity within the enclosure, the pressurized purge flow cavity defined by the base wall and selected sidewalls of the plurality of sidewalls.

12. The masking fixture of claim 11, further comprising a rigid cover, the rigid cover comprising a base wall and a plurality of side walls extending generally orthogonal to the base wall of the rigid cover, an inner surface of the base wall of the rigid cover and inner surfaces of the plurality of sidewalls of the rigid cover defining a cavity of the rigid cover, the flexible cover received within the cavity of the rigid cover.

13. The masking fixture of claim 12, further comprising a chamfer defined in an inner corner of each sidewall of the plurality of sidewalls of the rigid cover.

14. The masking fixture of claim 12, wherein the flexible cover further comprises an outer surface configured to form an interference fit with a corresponding portion of the inner surfaces of the plurality of sidewalls of the rigid cover.

15. The masking fixture of claim 14, wherein the portion of the inner surfaces of the plurality of sidewalls of the rigid cover comprises a chamfer defined in an inner corner of each sidewall of the plurality of sidewalls of the rigid cover.

16. The masking fixture of claim 11, further comprising a plurality of fasteners extending from the rigid cover for securing the masking fixture to a complementary masking fixture about a workpiece.

* * * * *